(12) United States Patent
McKenney (10) Patent No.: US 6,996,812 B2
(45) Date of Patent: Feb. 7, 2006

(54) SOFTWARE IMPLEMENTATION OF SYNCHRONOUS MEMORY BARRIERS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 09/884,597

(22) Filed: Jun. 18, 2001

(65) Prior Publication Data

US 2002/0194436 A1 Dec. 19, 2002

(51) Int. Cl.
*G06F 9/45* (2006.01)

(52) U.S. Cl. ...................................................... 717/138
(58) Field of Classification Search ................. 717/138, 717/151–161; 711/100; 712/205
See application file for complete search history.

(56) References Cited

U.S. PATENT DOCUMENTS

| | | | | |
|---|---|---|---|---|
| 5,155,832 A | * | 10/1992 | Hunt | 711/120 |
| 5,442,758 A | | 8/1995 | Slingwine et al. | 395/375 |
| 5,530,804 A | * | 6/1996 | Edgington et al. | 714/30 |
| 5,608,893 A | | 3/1997 | Slingwine et al. | 395/468 |
| 5,636,363 A | * | 6/1997 | Bourekas et al. | 711/138 |
| 5,727,209 A | | 3/1998 | Slingwine et al. | 395/672 |
| 5,796,996 A | * | 8/1998 | Temma et al. | 712/225 |
| 6,055,605 A | | 4/2000 | Sharma et al. | 711/130 |
| 6,085,263 A | | 7/2000 | Sharma et al. | 710/56 |
| 6,088,771 A | | 7/2000 | Steely, Jr. et al. | 711/154 |
| 6,131,155 A | * | 10/2000 | Alexander et al. | 712/207 |
| 6,219,690 B1 | | 4/2001 | Slingwine et al. | 709/102 |

OTHER PUBLICATIONS

Sites and Witek,"Alpha AXP Architecture Reference Manual", Second Edition, Digital Press., 1995, pp. 5-1–5-27.

* cited by examiner

*Primary Examiner*—Wei Y. Zhen
(74) *Attorney, Agent, or Firm*—Lieberman & Brandsdorfer, LLC

(57) ABSTRACT

Selectively emulating sequential consistency in software improves efficiency in a multiprocessing computing environment. A writing CPU uses a high priority inter-processor interrupt to force each CPU in the system to execute a memory barrier. This step invalidates old data in the system. Each CPU that has executed a memory barrier instruction registers completion and sends an indicator to a memory location to indicate completion of the memory barrier instruction. Prior to updating the data, the writing CPU must check the register to ensure completion of the memory barrier execution by each CPU. The register may be in the form of an array, a bitmask, or a combining tree, or a comparable structure. This step ensures that all invalidates are removed from the system and that deadlock between two competing CPUs is avoided. Following validation that each CPU has executed the memory barrier instruction, the writing CPU may update the pointer to the data structure.

28 Claims, 4 Drawing Sheets

SOFTWARE IMPLEMENTATION OF SYNCHRONOUS MEMORY BARRIERS

BACKGROUND OF THE INVENTION

1. Technical Field

This invention relates to software for implementing synchronous memory barriers in a multiprocessor computing environment. More specifically, the invention relates to a method and system for selectively emulating sequential consistency in a shared memory computing environment.

2. Description of the Prior Art

Multiprocessor systems contain multiple processors (also referred to herein as "CPUs") that can execute multiple processes or multiple threads within a single process simultaneously in a manner known as parallel computing. In general, multiprocessor systems execute multiple processes or threads faster than conventional single processor systems, such as personal computers, that execute programs sequentially. The actual performance advantage is a function of a number of factors, including the degree to which parts of a multithreaded process and/or multiple distinct processes can be executed in parallel and the architecture of the particular multiprocessor system. The degree to which processes can be executed in parallel depends, in part, on the extent to which they compete for exclusive access to shared memory resources.

Shared memory multiprocessor systems offer a common physical memory address space that all processors can access. Multiple processes therein, or multiple threads within a process, can communicate through shared variables in memory which allow the processes to read or write to the same memory location in the computer system. Message passing multiprocessor systems, in contract to shared memory system, have a separate memory space for each processor. They require processes to communicate through explicit messages to each other.

A significant issue in the design of multiprocessor systems is process synchronization. The degree to which processes can be executed in parallel depends in part on the extent to which they compete for exclusive access to shared memory resources. For example, if two processes A and B are executing in parallel, process B might have to wait for process A to write a value to a buffer before process B can access it. Otherwise, a race condition could occur, where process B might access the buffer while process A was part way through updating the buffer. To avoid conflicts, synchronization mechanisms are provided to control the order of process execution. These mechanisms include mutual exclusion locks, condition variables, counting semaphores, and reader-writer locks. A mutual exclusion lock allows only the processor holding the lock to execute an associated action. When a processor requests a mutual exclusion lock, it is granted to that processor exclusively. Other processors desiring the lock must wait until the processor with the lock releases it. To address the buffer scenario described above, both processes would request the mutual exclusion lock before executing further. Whichever process first acquires the lock then updates (in case of process A) or accesses (in case of process B) the buffer. The other processor must wait until the first processor finishes and releases the lock. In this way, the lock guarantees that process B sees consistent information, even if processors running in parallel execute processes A and B.

For processes to be synchronized, instructions requiring exclusive access can be grouped into a critical section and associated with a lock. When a process is executing instructions in its critical section, a mutual exclusion lock guarantees no other processes are executing the same instructions. This is important where processors are attempting to change data. However, such a lock has the drawback in that it prohibits multiple processes from simultaneously executing instructions that only allow the processes to read data. A reader-writer lock, in contrast, allows multiple reading processes ("readers") to access simultaneously a shared resource such as a database, while a writing process ("writer") must have exclusive access to the database before performing any updates for consistency. A practical example of a situation appropriate for a reader-writer lock is a TCP/IP routing structure with many readers and an occasional update of the information. Recent implementations of reader-writer locks are described by Mellor-Crummey and Scott (MCS) in "Scalable Reader-Writer Synchronization for Shared-Memory Multiprocessors," *Proceedings of the Third ACM SIGPLAN Symposium on Principles and Practice of Parallel Programming*, pages 106–113 (1991) and Hseih and Weihl in "Scalable Reader-Writer Locks for Parallel Systems," *Technical Report MIT/LCS/TR*-521 (November 1991).

The basic mechanics and structure of reader-writer locks are well known. In a typical lock, multiple readers may acquire the lock, but only if there are no active writers. Conversely, a writer may acquire the lock only if there are no active readers or another writer. When a reader releases the lock, it takes no action unless it is the last active reader, if so, it grants the lock to the next waiting writer.

A drawback of prior reader-writer locks is undesired memory contention, whereby multiple processors modify a single data structure in quick succession, possibly while other processors are spinning on the single data structure. The resulting cache misses can severely degrade performance. The drawback has been partially addressed in more recent locking schemes such as the ones described by Hseih and Weihl. Their static locking algorithm allocates one semaphore per processor, stored in memory local to the processor. An additional semaphore acts as a gate on the writers. To acquire a static lock, a reader need only acquire its local semaphore, greatly reducing the amount of spinning. However, a writer must still acquire all of the semaphores of which there is now one for each processor and the additional semaphore. When releasing a static lock, a reader simply releases its local semaphore and a writer releases all of the semaphores. The lock thus offers an improvement over prior locks in that the readers do not interfere with each other and readers do not have to go over the system interconnect to acquire a lock. However, the fact that readers never interfere means that writers must do a substantial amount of work in systems with many processors. When even a few percent of the requests are writes, the throughput suffers dramatically because a writer must acquire a semaphore for every processor on every node to successfully acquire the lock. Finally, use of multiple reader-writer locks is prone to deadlock. Accordingly, these drawbacks motivate techniques that do not require readers to acquire locks.

Read-copy update is one example of a technique that does not require readers to acquire locks. Another example where readers do not acquire locks is with algorithms that rely on a strong memory consistency model such as a sequentially consistent memory model. Sequentially consistent memory requires that the result of any execution be the same as if the accesses executed by each processor were kept in order and the accesses among different processors were interleaved. One way to implement sequential consistency is to delay the completion of some memory access. Accordingly, sequentially consistent memory is generally inefficient.

Figure 1A:
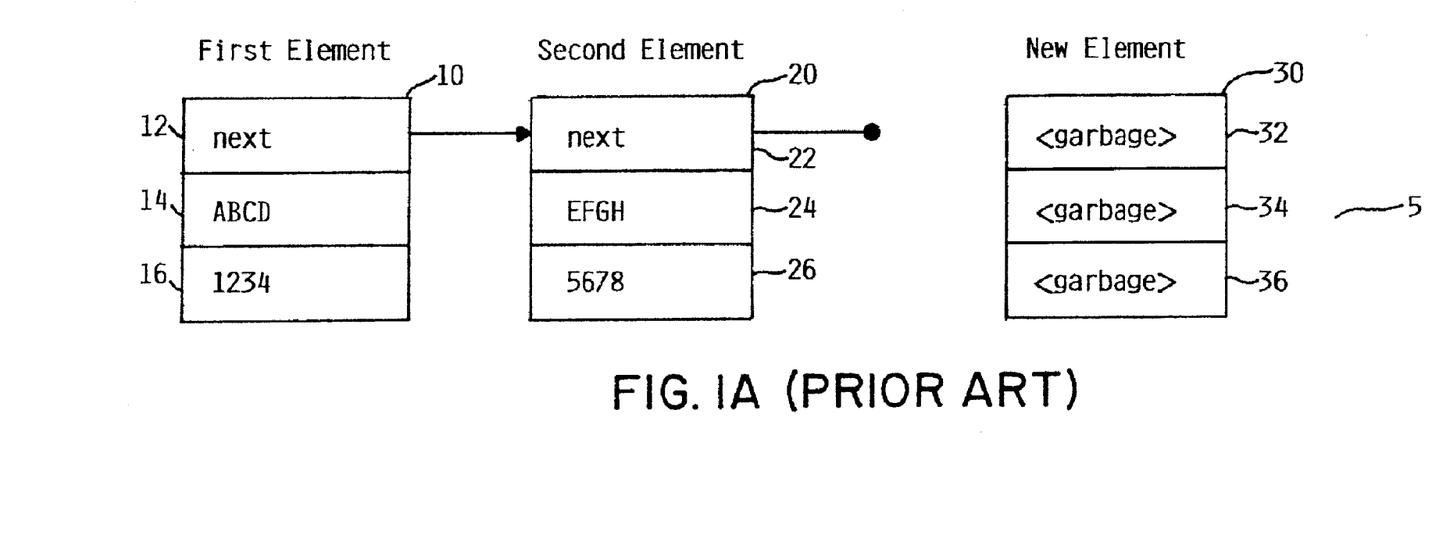
FIG. 1a is a block diagram of a prior art data structure at an initial state.
Figure 1B:
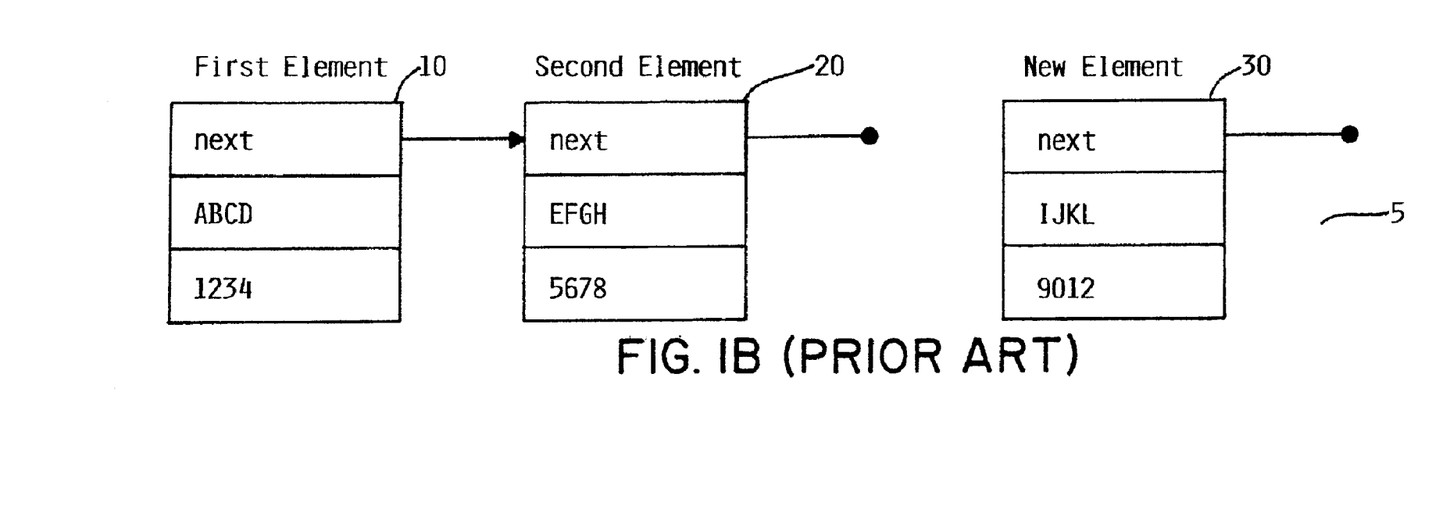
FIG. 1b is a block diagram of a prior art data structure with a new element initialized.
Figure 1C:
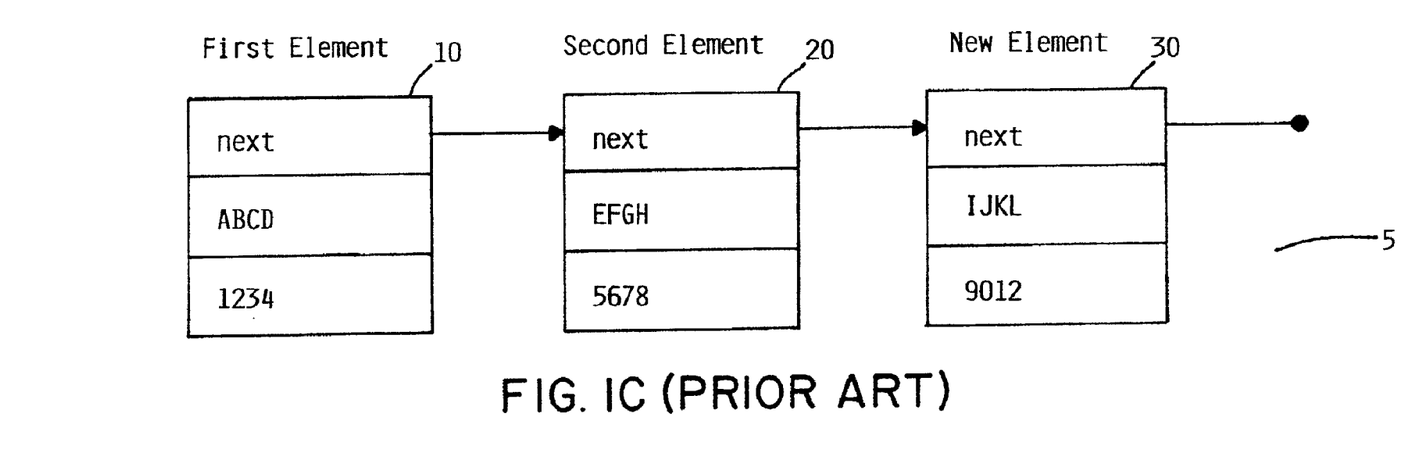
FIG. 1c is a block diagram of a prior art data structure with a new element appended to a list.

FIGS. 1a–c outline the prior art process of adding a new element 30 to a data structure 5 in a sequentially consistent memory model. FIG. 1a is an illustration of a sequentially consistent memory memory model for a data structure prior to adding or initializing a new element 30 to the data structure 5. The data structure 5 includes a first element 10 and a second element 20. Both the first and second elements 10 and 20, respectively, have three fields 12, 14 and 15, and 22, 24 and 26. In order to add a new element 30 to the data structure 5 such that the CPUs in the multiprocessor environment could concurrently search the data structure, the new element 30 must first be initialized. This ensures that CPUs searching the linked data structure do not see fields in the new element filled with corrupted data. Following initialization of the new element's 30 fields 32, 34 and 36, the new element may be added to the data structure 5. FIG. 1b is an illustration of the new element 30 following initialization of each of it's fields 32, 34 and 36, and prior to adding the new element 30 to the data structure 5. Finally, FIG. 1c illustrates the addition of the third element to the data structure following the initialization of the fields 32, 24 and 36. Accordingly, in a sequentially consistent memory model execution of each step in the process must occur in a program order.

Figure 2:
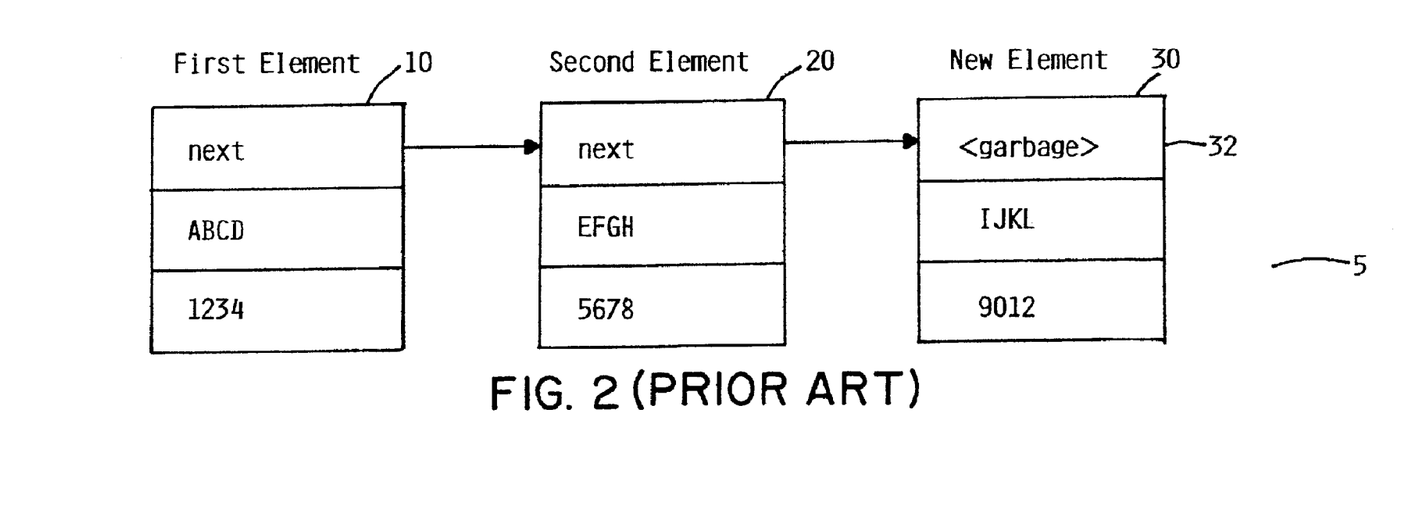
FIG. 2 is a block diagram of a prior art data structure of a weak memory-consistency model.

The process of FIGS. 1a–c is only effective on CPUs that use a strong memory consistency model such as sequential consistency. For example, the addition of a new element may fail in weaker memory models where other CPUs may see write operations from a given CPU happening in different orders. FIG. 2 is an illustration of a prior art weak memory-consistency model for adding a new element to a data structure. In this example, the write operation to the new element's 30 first field 32 passes the write operation to the second element's 20 next field. A CPU searching the data structure may see the first field 32 of the third element 30, resulting in corrupted data. The searching CPU may then attempt to use the data ascertained from the field 32 as a pointer, and most likely this would result in a program failure or a system crash. Accordingly, data corruption can be avoided by using CPUs that enforce stronger memory consistency.

Stronger hardware memory consistency requires more overhead and it cannot implicitly differentiate priority read and write requests. To overcome this problem, modem microprocessors implement relaxed memory consistency models where memory operations can appear to occur in different orders on different CPUs. For example, the DEC/Compaq Alpha has a memory barrier that serializes writes and invalidations, but only with respect to the CPU executing the memory barrier. There is no hardware mechanism to invalidate a data item from all other CPU's caches and to wait until these invalidations are complete. Accordingly, it is desirable to provide a high priority interprocessor interrupt to request that all CPUs in the system execute a memory barrier instruction, thereby requiring both reading and updating CPUs to have passed through a memory barrier to ensure a consistent view of memory.

SUMMARY OF THE INVENTION

It is therefore an object of the invention to provide software for implementing synchronous memory barriers in a multiprocessor computer system. It is a further object of the invention to process memory invalidates through the use of memory barrier instructions to ensure a consistent view of memory.

A first aspect of the invention is a method of selectively emulating sequential consistency in software. Each CPU in the multiprocessing computer environment is forced to execute a memory barrier instruction. Following execution of the memory barrier, each CPU sends an indicator to communicate completion of the memory barrier instruction. An interprocessor interrupt is sent to each CPU to force execution of the memory barrier instruction. To avoid deadlock, execution of memory barrier instructions from a responding CPU are registered with the requesting CPU. Furthermore, CPUs waiting for other CPUs to execute memory barrier instructions must remain sensitive to concurrent requests. Implementation of registration of memory barrier instructions is preferably, but not necessarily, selected from the group consisting of a bitmask, an array and a combining tree.

A second aspect of the invention is a multiprocessor computer system which includes an instruction for forcing each CPU to execute a memory barrier instruction, and an instruction manager for indicating completion of the memory barrier instruction. A memory barrier manager is provided to send an interprocessor interrupt to all of the CPUs to force execution of the memory barrier instruction. To avoid deadlock between competing CPUs, registration of execution of a memory barrier instruction from a responding CPU is provided to the requesting CPU. In addition, the requesting CPU remains sensitive to and executes concurrent requests. Implementation of registration of instructions is preferably, but not necessarily, selected from the group consisting of a bitmask, an array, and a combining tree.

A third aspect of the invention is an article comprising a computer-readable signal bearing medium with multiple processors operating within the medium. The article includes means in the medium for forcing each CPU to execute a memory barrier instruction, and an instruction manager for indicating completion of the memory barrier instruction. A memory barrier manager is provided to send an interprocessor interrupt to all of the CPUs to force execution of the memory barrier instruction. To avoid deadlock between competing CPUs, registration of execution of memory barrier instruction from a responding CPU is provided to the requesting CPU. In addition, the requesting CPU remains sensitive to and executes concurrent requests. Implementation of registration of instructions is preferably, but not necessarily, selected from the group consisting of a bitmask, an array, and a combining tree.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In shared memory multiprocessor systems, it is essential that multiple processors see a consistent view of memory. Examples of techniques in which the reading CPU does not acquire a lock is seen in read-copy update and in the implementation of a weak memory barrier instruction in a sequential consistency model. The following is pseudocode for updating a pointer to a new element in a linked list:

1. Initialize new structure, including the pointer to the next element.
2. Register a read-copy callback that invokes a function that awakens all processes sleeping on a semaphore "s".
3. Sleep on semaphore "s".
4. Make the intended predecessor element point to the new element.

Since the read-copy callback implementation forces a memory barrier to execute on each CPU, all reading CPUs are guaranteed to execute a memory barrier between the time that the structure is initialized and the pointer is modified, as is required to avoid memory corruption. However, this procedure is not usable from within interrupt handlers, spinlock critical sections, or sections of code with interrupts disabled. CPUs that use relaxed memory consistency models fail to provide a mechanism to resolve the reading CPUs from reading data that is in the process of being invalidated. Accordingly, it is desirable and efficient to implement a software to emulate sequential consistency while avoiding a deadlock scenario between multiple CPUs.

Technical Background

Figure 3:
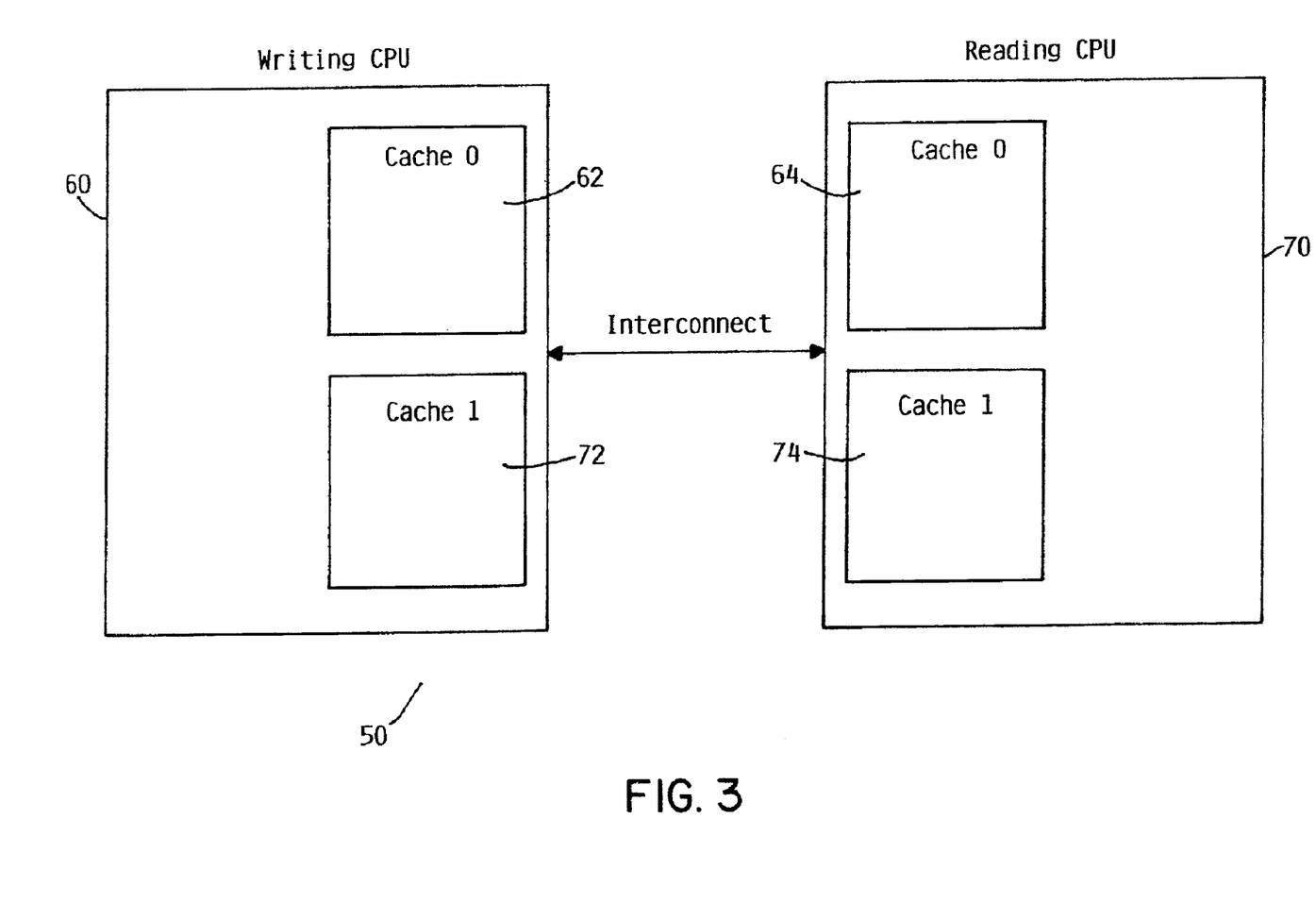
FIG. 3 is a block diagram of the interconnect between a reading CPU and a writing CPU.

In general, implementing a software approach to a weak memory consistency model improves efficiency while alleviating overhead. FIG. 3 refers to a block diagram 50 of a writing CPU 60 and a reading CPU 70 for illustrating the issue of the weak memory barrier execution. Each CPU has even numbered cache lines processed by cache$_0$ 62 and 64, respectively, and odd numbered cache lines processed by cache$_1$ 72 and 74, respectively. The cache-line size is 72 bytes with the even numbered cache line at addresses 0, 64, 128, 192, 256 . . . , and the odd numbered cache lines at addresses 32, 96, 160, 224, 288 . . . . In this example, the writing CPU 60 is adding a new data structure to the end of a linked list while the reading CPU 70 is concurrently scanning the same linked list. The writing CPU 60 can first fill in the data structure and then update the pointer from the last element in the linked list to point to the new element. However, this procedure can result in the reading CPU 70 seeing garbage values in this new element since the update to the pointer might propagate to the reading CPU faster than the changes to the data structure. For example, the pointer might be in an even numbered cache line and the new element might reside in an odd numbered cache line, and the even numbered hardware might be idle while the odd numbered hardware might be busy. Accordingly, there is a need to implement proper execution of a memory barrier to ensure memory consistency with both CPUs.

To ensure memory consistency with the example illustrated in FIG. 3, the writing CPU 60 must execute a memory barrier instruction after filling in the data structure and before updating the pointer. In the case where the memory barrier instruction's effect is limited to a single CPU, the memory barrier instruction executed by the writing CPU 60 would force the invalidations to appear in order on the interconnect, but would not guarantee that the reading CPU 70 would process the invalidations in order. For example, the even numbered cache hardware in the reading CPU 70 might be idle while the odd numbered cache hardware on the reading CPU might be busy. This would result in the reading CPU 70 reading the new value of the pointer but seeing the old data in the data element. Accordingly, there is a need to ensure that the old data is invalidated prior to the reading CPU 70 accessing the data structure.

Figure 4:
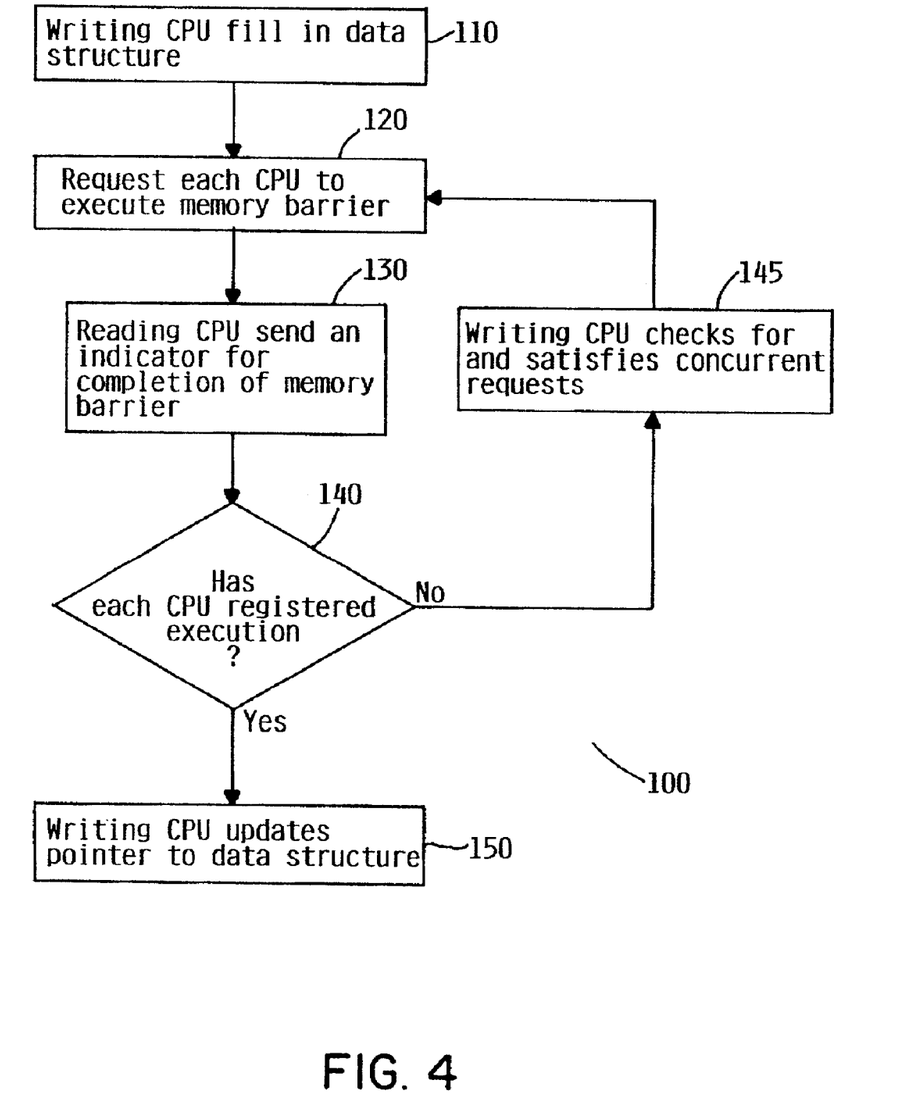
FIG. 4 is a flow chart illustrating sequential consistency according to the preferred embodiment of this invention, and is suggested for printing on the first page of the issued patent.

FIG. 4 is a flowchart 100 illustrating a process for updating a pointer to a data structure utilizing the implementation of memory barriers. A CPU updating a data structure may write to the data structure 110. This CPU is referred to as the writing CPU. During this process, each CPU accessing and reading the data structure is utilizing the old data structure until such time as the writing CPU updates the pointer to the new element. Each CPU reading the data structure is known as a reading CPU. Following the update of the data structure, the writing CPU forces each CPU in the system to execute a memory barrier instruction 120. The writing CPU uses a high priority inter-processor interrupt to force all CPUs to execute the memory barrier instruction. The execution of the memory barrier instruction invalidates the stale data and ensures that the reading CPUs will access the new data in the modified data structure. Each CPU sends an indicator to a memory location to indicate completion of the memory barrier instruction 130. This step ensures a recordation in a common location to indicate completion of the memory barrier instruction. Accordingly, the writing CPU forces execution of a memory barrier instruction by each CPU in the system in order to invalidate old data prior to updating the pointer to the data structure for the new data.

However, it is critical to avoid deadlock between two competing writing CPUs. Each writing CPU must ensure that each CPU has completed the memory barrier execution 140 prior to updating the pointer to the data structure. If each CPU has not executed a memory barrier instruction, the writing CPU cannot update the pointer to the data structure. The writing CPU must wait for each CPU to execute a memory barrier instruction, or it may again request execution of a memory barrier instruction 120. While the writing CPU is waiting for each CPU to register execution of the memory barrier, the writing CPU checks for and satisfies concurrent memory barrier execution requests, 145. When each CPU has registered completion of execution of the memory barrier instruction, the writing CPU may update the pointer to the data structure 150. Accordingly, following a review of the register to ensure that each CPU in the system has executed the memory barrier instruction, the writing CPU may update the pointer to the data structure.

There are two components for avoiding deadlocks, registering completion of execution of memory barrier instructions, and satisfying concurrent memory barrier requests. A first embodiment for avoiding a deadlock scenario is to provide an array for each CPU to register memory barrier execution requests. The array provides for one entry per CPU. A CPU requesting a lock to write to the data structure must scan the array to guarantee that all CPUs have executed a memory barrier to flush out any invalidates prior to updating the pointer. In a preferred embodiment, each entry in the array is a bitmask, with one bit per CPU. The CPU requesting the lock to update the pointer sends an interrupt to all CPUs to force a memory barrier execution. Each CPU uses an atomic operation to subtract its bits from each CPUs bitmask from the array, and the requesting CPU must scan the array until each of the values in the array is zero. During this time, the writing CPU checks for and satisfies concurrent memory barrier requests. This guarantees that each CPU has executed a memory barrier instruction.

Pseudocode for a CPU responding to a request to execute a memory barrier instruction in conjunction with an array entry system of the first embodiment is as follows:

1. Set a local variable "cleared_bits" to zero.
2. Suppress interrupts.
3. Acquire the "need_mb_lock".
4. Scan the "need_mb" array. For each entry that has this CPU's bit set, do the following:
    a) Clear this CPU's bit.
    b) Increment the "cleared_bits" local variable.
5. If "cleared_bits" is non-zero, execute a memory-barrier instruction.
6. Release the "need_mb_lock".
7. Restore interrupts.

Accordingly, step 4 entails the step for registering completion of memory barrier execution.

Some architectures allow for combining the acquisition and release of the lock with the suppressing and restoring of interrupts, respectively. Pseudocode for a CPU requesting a global memory-barrier shootdown in conjunction with the array entry system of the first embodiment is as follows:

1. Suppress interrupts.
2. Acquire the "need_mb_lock".
3. Execute a memory-barrier instruction, which may be implied by the acquisition of the lock.
4. Within the "need_mb_entry" for this CPU, set the bits for all the other CPUs.
5. Release the "need_mb_lock".
6. Send interrupts to every other CPU.
7. While this CPU's "need_mb" entry is non-zero, repeat the following steps:
    a) Set a local variable "cleared_bits" to zero.
    b) Scan the "need_mb" array. For each entry "j":
        i) If the j'th entry has this CPU's bit set:
            (1) Acquire the "need_mb_lock".
            (2) Clear this CPU's bit.
            (3) Increment the "cleared_bits" local variable.
            (4) Release the "need_mb_lock".
    c) If "cleared_bits" is non-zero, execute a memory-barrier instruction.
8. Restore interrupts.

Step 7 and the subordinate steps avoid deadlock by causing waiting CPUs to respond to concurrent requests by other CPUs. Accordingly, both of the implementations of the array system require the requesting CPU to scan the array to ensure that each of the other CPUs have executed the memory barrier prior to updating a pointer in the data structure, while requiring waiting CPUs to respond to concurrent memory barrier requests, thereby avoiding deadlock.

A second embodiment for avoiding a deadlock scenario is to use a generation-based bitmask. Each memory-barrier execution request is assigned a generation number. Requests that are initiated while a previous request is being serviced is assigned the same generation number as the previous request. Once a generation number is serviced, a request is complete. Deadlock is avoided by having all waiting CPUs repeatedly execute memory-barrier instructions and registering completion of the memory-barrier instruction with the bitmask.

Pseudocode for a CPU responding to an interrupt requesting a memory-barrier execution implementing the generation based bitmask is as follows:

1. Suppress interrupts.
2. If our bit in "need_mb" (bitmask) is not set, restore interrupts and return.
3. Acquire "need_mb_lock".
4. Execute a memory-barrier instruction
5. Clear out bit in "need_mb". If ours is the last bit set, do the following:
    a) Increment the "current generation" counter.
    b) If the "current generation" counter is less than or equal to the "maximum generation" counter, do the following:
        i) Set each CPU's bit (except for this CPU's bit) in the "need_mb" bitmask.
        ii) Send interrupts to each other CPU.
6. Release "need_mb_lock".

Accordingly, step 5 entails the step for registering completion of memory barrier execution.

Pseudocode for a CPU requesting a global memory-barrier shootdown is as follows:

1. Suppress interrupts and acquire "need_mb_lock".
2. Execute a memory-barrier instruction.
3. If the current generation is less than or equal to the maximum generation, do the following:
    a) Set "maximum generation" to "current generation"+1.
4. Otherwise, do the following:
    a) Set "maximum generation" to "current generation".
    b) Set "my generation" to "maximum generation".
    c) Set each CPU's bit (except for this CPU's bit) in the "need_mb" bitmask.
    d) Send interrupts to each other CPU.
5. Set "my generation" to "maximum generation".
6. Release "need_mb_lock".
7. While "my generation" is greater than or equal to "current generation":
    a) Invoke the procedure that responds to a request for each CPU to execute a memory barrier instruction.

Accordingly, Step 7 ensures that the waiting CPUs remain sensitive to and respond to concurrent memory barrier requests.

In implementing either the first or second embodiments to avoid deadlock, it is critical to have each reading CPU execute a memory barrier instruction. However, it may be desirable for each CPU, including the writing CPU requesting the memory barrier instruction for the remaining CPUs, to execute a memory barrier instruction. Execution of the memory barrier instruction invalidates old data from each CPU's cache. Implementation of the memory barrier execution by each CPU is conducted by sending a high priority interprocessor interrupt to all CPUs in the system. This forces each CPU to execute the associated memory barrier instruction. Concurrent memory barrier execution requests are merged into groups wherein each group of requests are assigned a generation number. A current generation number is assigned to all arriving memory barrier execution requests, while a previous memory barrier execution request is being serviced. The software for emulating sequential consistency further requires each CPU waiting for other CPUs to execute a set of memory barrier instructions to continuously satisfy concurrent memory barrier execution requests. In a multiprocessing computing environment, each CPU may have a different agenda, and multiple memory barrier execution requests may be processing within a short time interval. Accordingly, it is critical that concurrent memory barrier instruction requests are met to ensure that invalidated data is not consumed in an inappropriate manner.

Advantages over the Prior Art

The implementation of software for synchronizing memory barrier instructions improves performance in reading and writing operations. By implementing a memory barrier request from the writing CPU, invalidates are forced to be processed before the reading CPUs read the pointer to the data structure. This ensures that the reading CPUs are not reading invalidated data or data that is in the process of being invalidated. A strong hardware consistency model uses more time and therefore has a greater overhead. The implementation of the memory barrier flushes out the invalidations. Furthermore, hardware cannot implicitly differentiate priority between reading and writing operations. Accordingly, the method for emulating sequential consistency in software reduces costs and ensures avoidance of a deadlock between multiple CPUs.

Alternative Embodiments

It will be appreciated that, although specific embodiments of the invention have been described herein for purposes of illustration, various modifications may be made without departing from the spirit and scope of the invention. In particular, alternative mechanisms may be employed in order to avoid deadlock between multiple CPUs. For example, a set of request counters may be used in conjunction with registers to ensure that no more than one CPU is acting at any one time. Another mechanism is the use of a combining tree to ensure that no more than one CPU is acting at any one time. A combining tree mechanism may be desirable in a NUMA environment, or in an alternative computer system where it may be desirable to reflect the bus structure of the computer system. Accordingly, the scope of protection of this invention is limited only by the following claims and their equivalents.

I claim:

1. A method for selectively emulating sequential consistency in software comprising:
   (a) forcing each CPU to execute a memory barrier instruction; and
   (b) having each CPU send an indicator communicating completion of said memory barrier instruction.

2. The method of claim 1, wherein the step of forcing each CPU to execute a memory barrier instruction includes sending an interprocessor interrupt to all CPUs.

3. The method of claim 2, further comprising avoiding deadlock by having each CPU that is waiting for other CPUs to execute said memory barrier instruction continuously satisfy concurrent memory barrier execution requests.

4. The method of claim 1, further comprising using a single set of memory barrier instruction executions to satisfy groups of concurrent memory barrier execution requests.

5. The method of claim 4, further comprising assigning a generation number to each group of said memory barrier execution requests.

6. The method of claim 5, further comprising assigning a current generation number to all arriving memory barrier execution requests while a previous memory barrier execution request is being serviced.

7. The method of claim 1, wherein the step of having each CPU send an indicator communicating completion of said memory barrier instruction comprises said CPUs registering completion of said memory barrier with a tool selected from the group consisting of: an array, a bitmask, and a combining tree.

8. The method of claim 1, further comprising providing an array for CPUs to register memory barrier requests, wherein each array entry corresponds to a memory barrier execution request from a CPU.

9. The method of claim 8, further comprising scanning said array to determine execution of said memory barrier instruction by each CPU.

10. A computer system, comprising:
    multiple processors;
    an instruction for forcing each CPU to execute a memory barrier instruction; and
    an instruction manager for indicating completion of said memory barrier instruction.

11. The system of claim 10, wherein the instruction for forcing each CPU to execute a memory barrier instruction comprises a memory barrier manager for sending an interprocessor interrupt to all CPUs.

12. The system of claim 11, wherein the memory barrier manager includes a waiting instruction to require each CPU waiting for other CPUs to execute said memory barrier instructions to satisfy concurrent memory barrier execution requests.

13. The system of claim 10, wherein the instruction for forcing each CPU to execute a memory barrier instruction comprises a consolidation instruction to satisfy groups of concurrent memory barrier execution requests with a single set of memory barrier instruction executions.

14. The system of claim 13, wherein each group of said memory barrier execution requests is assigned a generation number.

15. The system of claim 14, wherein all memory barrier execution requests that arrive while a previous memory barrier execution request is executing are assigned current generation numbers.

16. The system of claim 10, wherein the instruction manager includes a tool for each CPU to register completion of said memory barrier instruction.

17. The system of claim 16, wherein said tool is selected from the group consisting of: a bitmask, an array, and a combining tree.

18. The system of claim 10, wherein the instruction manager includes array for CPUs to register memory barrier requests.

19. The system of claim 18, wherein each entry to said array corresponds to a memory barrier execution request from a CPU.

20. The system of claim 19, wherein each requesting CPU scans said array to determine execution of said memory barrier instruction by each CPU.

21. An article comprising:
    a computer-readable medium;
    means in the medium for forcing each CPU to execute a memory barrier instruction; and
    an instruction manager for indicating completion of said memory barrier instruction.

22. The article of claim 21, wherein the medium is a recordable data storage medium.

23. The article of claim 21, wherein the means for forcing each CPU to execute the memory barrier instruction includes a memory barrier manager for sending an interprocessor interrupt to all CPUs.

24. The article of claim 21, wherein each CPU waiting for other CPUs to execute said memory barrier instruction continuously satisfies concurrent memory barrier execution requests.

25. The article of claim 21, wherein the instruction manager includes a tool for each CPU to register completion of said memory barrier instruction.

26. The article of claim 25, wherein said tool is selected from the group consisting of: a bitmask, an array, and a combining tree.

27. A method for selectively emulating sequential consistency in software comprising:
(a) forcing each CPU to execute a memory barrier instruction;
(b) having each CPU send an indicator communicating completion of said memory barrier instruction;
(c) satisfying groups of concurrent memory barrier execution requests with a single set of memory barrier instruction executions; and
(d) wherein the step of forcing each CPU to execute a memory barrier instruction includes sending an interprocessor interrupt to all CPUs forcing execution of said memory barrier instruction.

28. The method of claim 27, wherein the step of having each CPU send an indicator communicating completion of said memory barrier instruction comprises said CPUs registering completion of said memory barrier with a tool selected from the group consisting of: a bitmask, an array, and a combining tree.

* * * * *